United States Patent [19]

Morita

[11] Patent Number: 4,494,272
[45] Date of Patent: Jan. 22, 1985

[54] REVERSIBLE CASTER DEVICE HAVING BRAKE MECHANISM

[76] Inventor: Natsuo Morita, 1983-1 Ohoka Takadacho, Numazu-shi, Shizuoka-ken, Japan

[21] Appl. No.: 397,831

[22] Filed: Jul. 13, 1982

[30] Foreign Application Priority Data

Jul. 21, 1981 [JP] Japan ............................. 56-112932
Oct. 26, 1981 [JP] Japan ......................... 56-158257[U]
Jun. 14, 1982 [JP] Japan ............................. 57-100720

[51] Int. Cl.³ .............................................. B60B 33/02
[52] U.S. Cl. ................................... 16/35 R; 188/1.12; 280/79.1 R
[58] Field of Search ............... 16/18 R, 20, 21, 35 R; 188/1.12, 29

[56] References Cited

U.S. PATENT DOCUMENTS

| | | | |
|---|---|---|---|
| 2,138,433 | 11/1938 | Sunden | 16/35 R |
| 2,885,720 | 5/1959 | Seeberger | 16/35 R X |
| 2,963,732 | 12/1960 | Kramcsak, Jr. et al. | 16/35 D X |
| 3,298,467 | 1/1967 | Darnell | 188/1.12 X |
| 3,518,714 | 4/1970 | Hager | 16/35 R |
| 4,226,413 | 10/1980 | Daugherty | 188/1.12 X |

FOREIGN PATENT DOCUMENTS 2706300 8/1978 Fed. Rep. of Germany ..... 16/35 R

Primary Examiner—Fred A. Silverberg
Attorney, Agent, or Firm—Schwartz & Weinrieb

[57] ABSTRACT

A caster device wherein a wheel frame mounted on a mounting base mounted on the lower surface of a traveling body in such a manner that the wheel frame may be rotated horizontally with respect to the mounting base comprises a swivel frame and a pivotal frame which can rotate together with the swivel frame and can pivotally move in a lateral direction within a preselected range, the pivotal frame having a wheel mounted thereon, the caster device comprising a direction restraining device capable of engaging the mounting base and pivotal frame in one direction of traveling of the wheel, and a brake device for applying a braking action to the wheel when it is changed over in traveling direction, whereby the pivotal frame is pivotally moved by the braking action resulting from the changeover of the traveling direction of the wheel to automatically bring the wheel frame into a freely swiveling state or a restrained state depending on the traveling direction.

18 Claims, 31 Drawing Figures

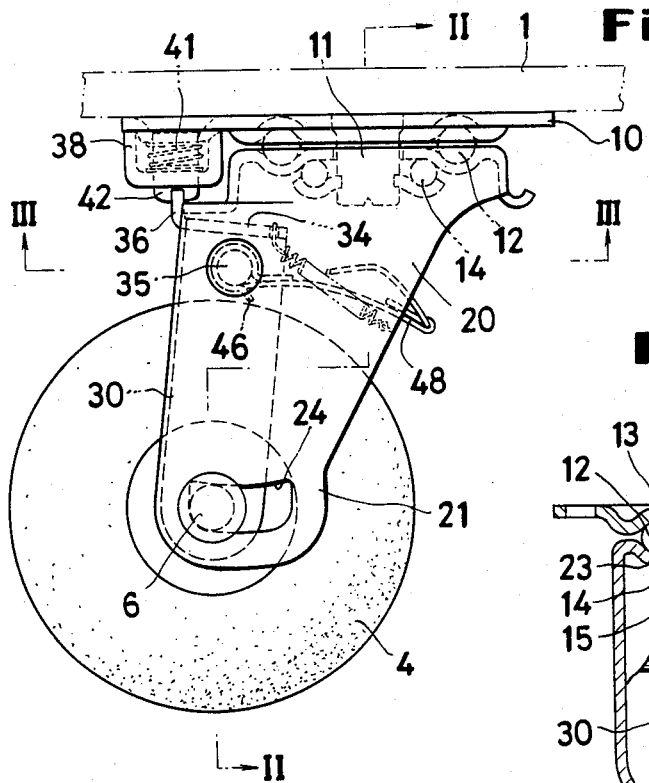
Fig_1
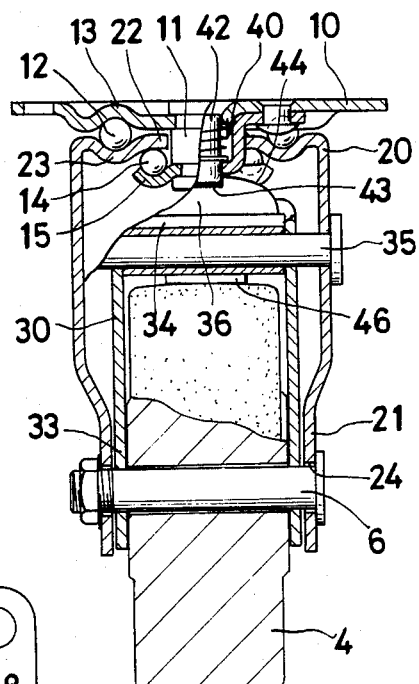
Fig_2
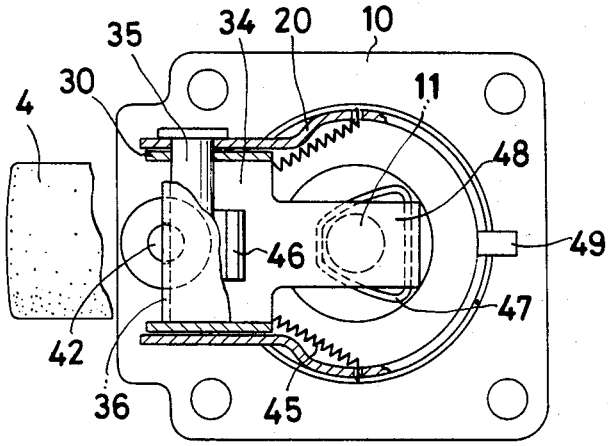
Fig_3

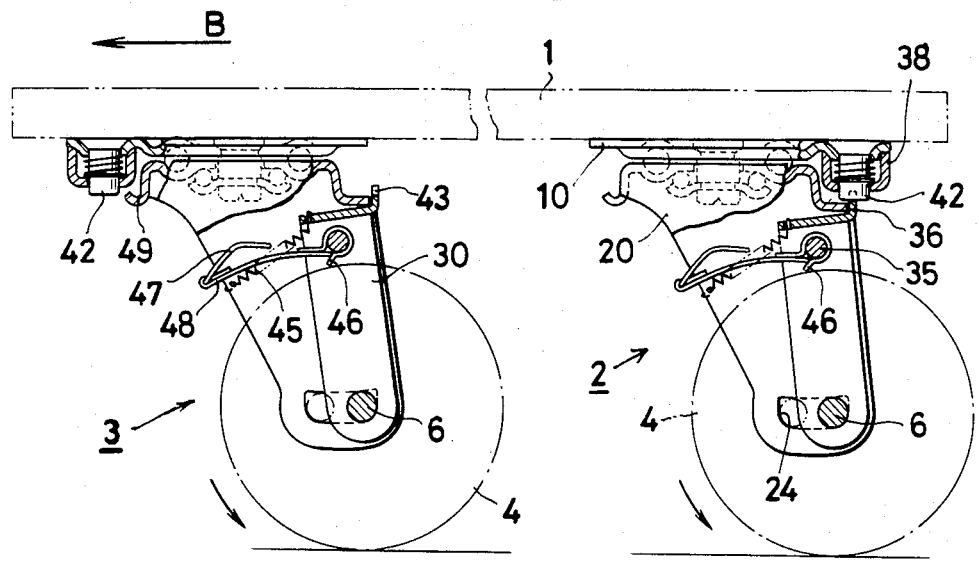
Fig_6
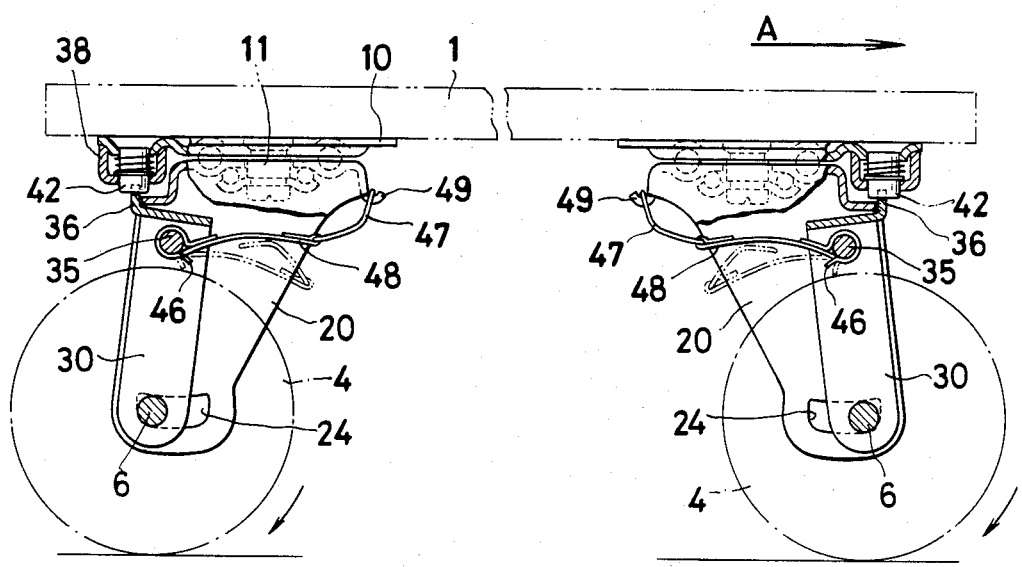
Fig_7(A)

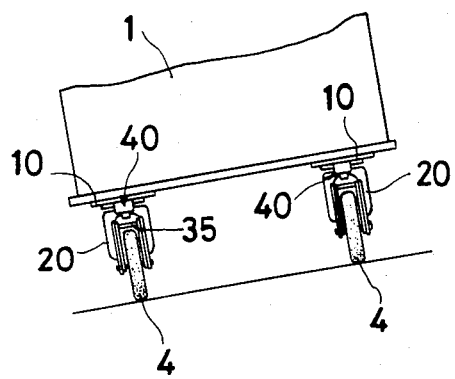
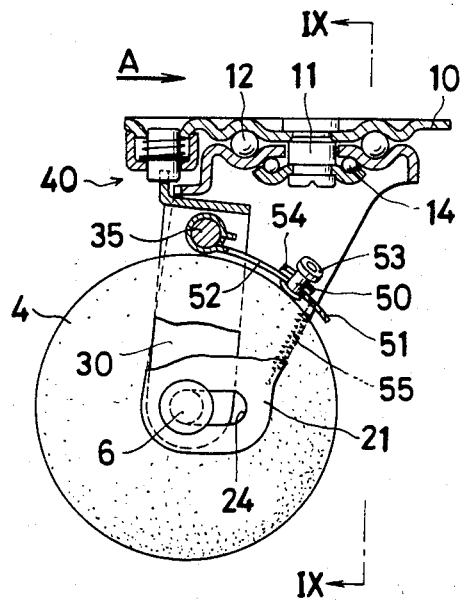
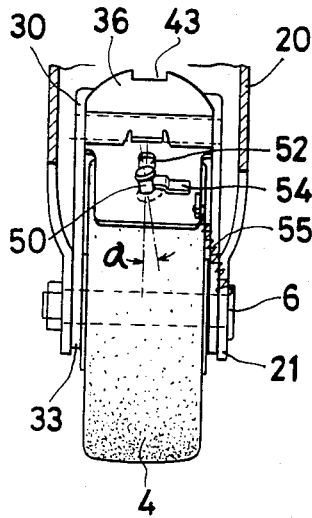
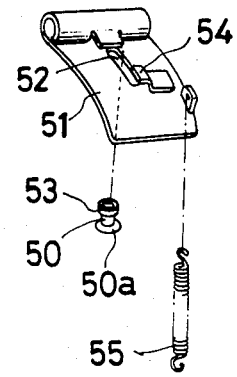
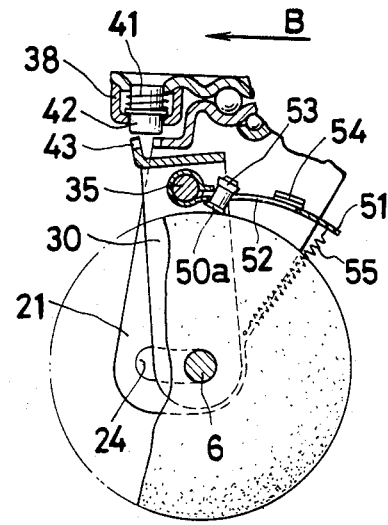

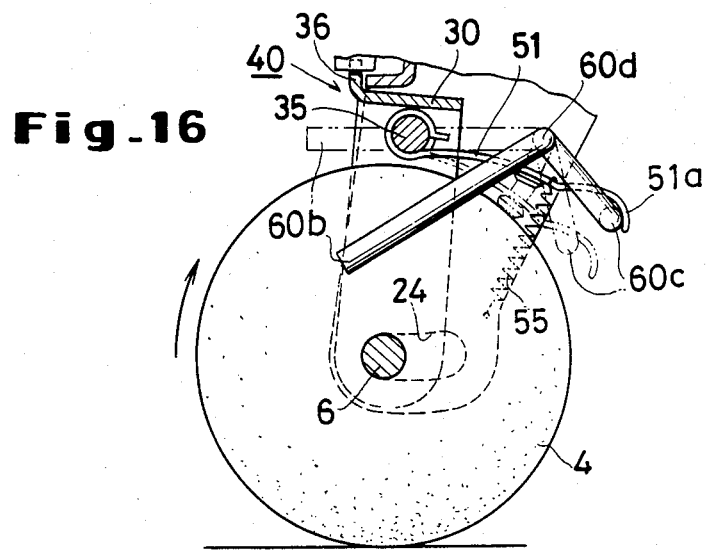
Fig_16
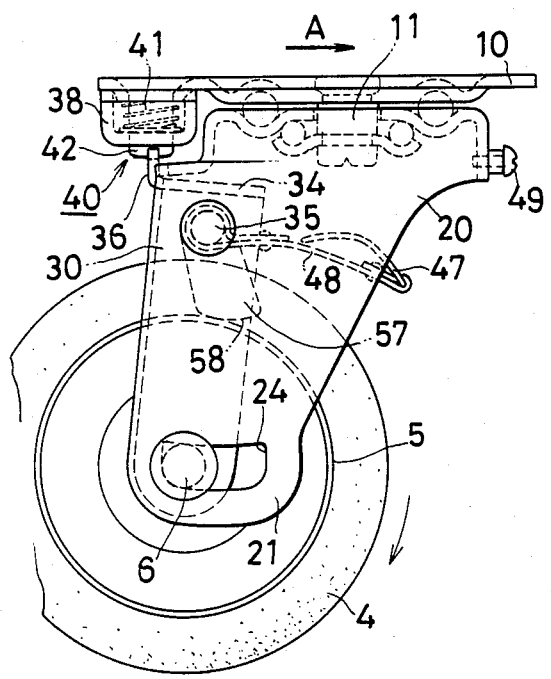
Fig_17
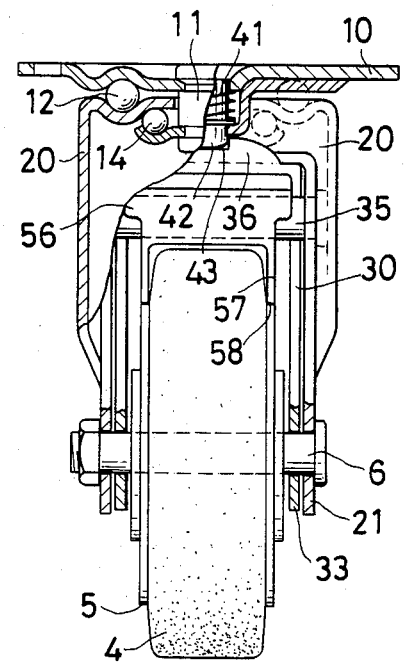
Fig_18

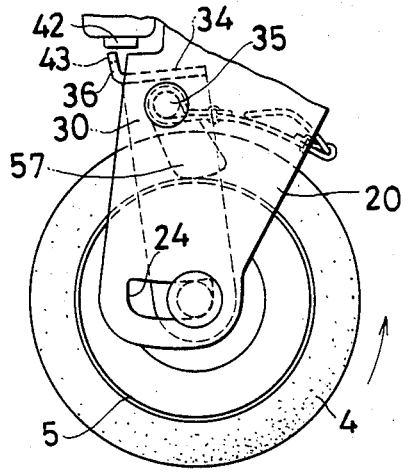
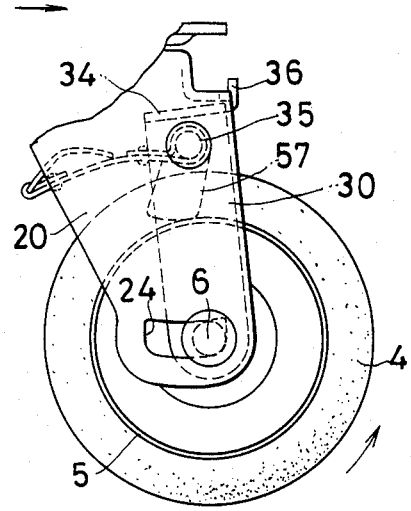
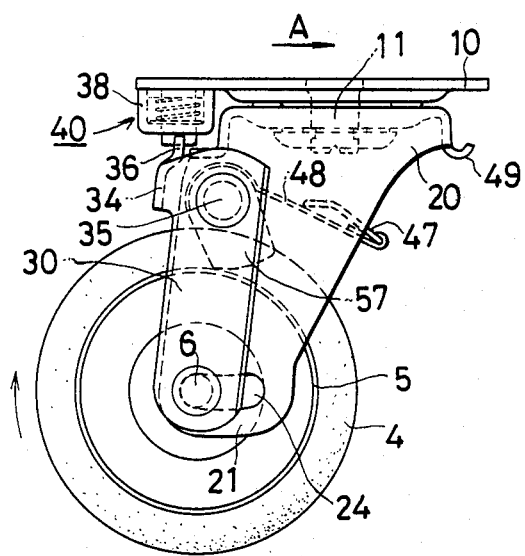
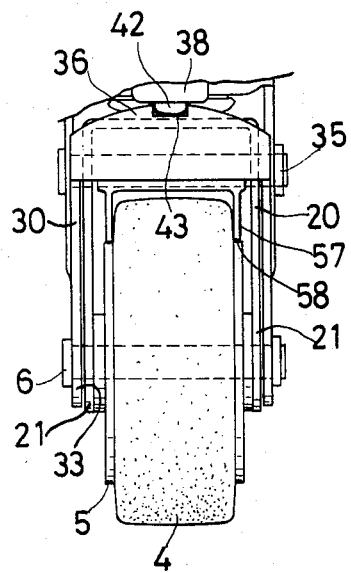

REVERSIBLE CASTER DEVICE HAVING BRAKE MECHANISM

FIELD OF THE INVENTION

The present invention relates to a caster device which can assume two states, namely a free state wherein a leg rotatably supporting thereon a caster can be freely swiveled with respect to a base and a restrained state wherein the swiveling of the leg is restrained, and particularly to a caster device in which the changeover between the free state and the restrained state can be effected by changing the moving direction of the wheel.

BACKGROUND OF THE INVENTION

It is known to provide a traveling body such as a large suitcase, a luggage carrier, various wagons, and the like with four caster wheels mounted on the lower surface thereof so as to be positioned at the four corners thereof. If these four wheels are all designed to be swiveled freely, the traveling direction will not be fixed, whereas if all the wheels are restrained from swiveling, it will difficult to move the body in a curved fashion. It is therefore desirable for the two wheels that are forward relative to the traveling direction to be free to swivel and the two wheels that are rearward to be restrained from swiveling. However, it has been impossible for conventional caster devices to provide the wheel states as mentioned above, regardless of the traveling direction, merely by changing the traveling direction of the traveling body without performing any operation.

The present inventor has proposed a caster device which can meet the requirements as described hereinbefore. Namely, his Laid-open Japanese Patent Application No. 55-156702 discloses a caster device in which the swivel shaft of the wheel is provided integrally with a supporting frame of the wheel, the swivel shaft being rotatably supported on a base housing, an engaging element and a locking member having a locking portion which engages the engaging element to restrain the rotation of the swivel shaft are provided on the side of the swivel shaft and the side of the base housing, respectively, and the engaging element and the locking portion of the locking member are engaged or disengaged responsive to the urging of the engaging element resulting from the swiveling force of the supporting frame so that the changeover between the free state and restrained state of the wheel may be effected by changing the moving direction of the wheel. According to this caster device, it is always possible to freely swivel the two front wheels and to restrain the swiveling of the two rear wheels, irrespective of the traveling direction of the traveling body. However, in the case the traveling body has a great weight or in the case the traveling body is loaded with heavy articles, the aforesaid engaging element is apt to become disengaged from the locking portion of the locking member due to the traveling inertia resulting from said weight, thus giving rise to the situation that the swiveling of the rear wheels may not be restrained.

SUMMARY OF THE INVENTION

It is therefore an object of the present invention to provide a caster device which can positively perform the switchover of the states of a wheel leg from a swivel free state to a swivel restraining state, or vice versa, in response to the changeover of the moving direction of the wheel.

The caster device in accordance with the present invention has been achieved on the basis of a conception totally different from that of the caster device proposed as mentioned hereinbefore. The caster device of the present invention is characterized in that wheels are supported on a pivotal frame separately from a swivel frame which can be swiveled about a main shaft of a mounting base; the pivotal frame is pivotally mounted on the swivel frame pivotably by a preselected angle through a pivotal shaft which is horizontal and positioned laterally away from the main shaft; the mounting base and pivotal frame are provided with a direction restraining means which is engageable in either traveling direction of the wheel; and a brake means is provided to apply braking action to the wheels when the traveling direction of the wheels is changed over, and said direction restraining means is engaged or disengaged by the pivotal movement of the pivotal frame resulting from the braking action and by the swiveling force of the swivel frame resulting from the changeover of the traveling direction.

BRIEF DESCRIPTION OF THE DRAWINGS

Other objects and features of the present invention will become apparent from the following detailed description in connection with the accompanying drawings, wherein:

FIG. 1 is a side view showing a first embodiment of a caster device in accordance with the present invention.

FIG. 2 is a sectional view taken along line II—II in FIG. 1.

FIG. 3 is a sectional view taken along line III—III of FIG. 1.

FIG. 6 is a side sectional view showing the state of the caster device after the traveling body has begun to be moved in the opposite direction.

FIG. 7(A) is a side sectional view showing the state of the caster device when the traveling body is moved crosswise to the direction of incline of an inclined surface.

FIG. 7(B) is a front view showing the state of the caster device when the traveling body is moved crosswise to the direction of incline of an inclined surface.

FIG. 8 is a side sectional view showing a second embodiment of the caster device in accordance with this invention.

FIG. 9 is a sectional view taken along line IX—IX of FIG. 8.

FIG. 10 is an exploded perspective view of the brake means of the caster device in accordance with the second embodiment.

FIG. 11 is a side sectional view showing the state in which the brake of the caster device is actuated in the second embodiment.

FIG. 16 is a side view illustrating the operating state of the brake of the caster device in accordance with the third embodiment.

FIG. 17 is a side view showing a fourth embodiment of the caster device in accordance with the present invention.

FIG. 18 is a partially cutaway front view of the caster device shown in FIG. 17.

FIGS. 19 and 20 are side views respectively illustrating the operating state of the brake of the caster device shown in FIG. 17.

FIG. 21 is a perspective view of the brake means of the caster device shown in FIG. 17.

FIG. 22 is a side view showing a fifth embodiment of the caster device in accordance with the present invention.

FIG. 23 is a front view of the caster device shown in FIG. 22.

DESCRIPTION OF THE ILLUSTRATED EMBODIMENTS

Figure 4:
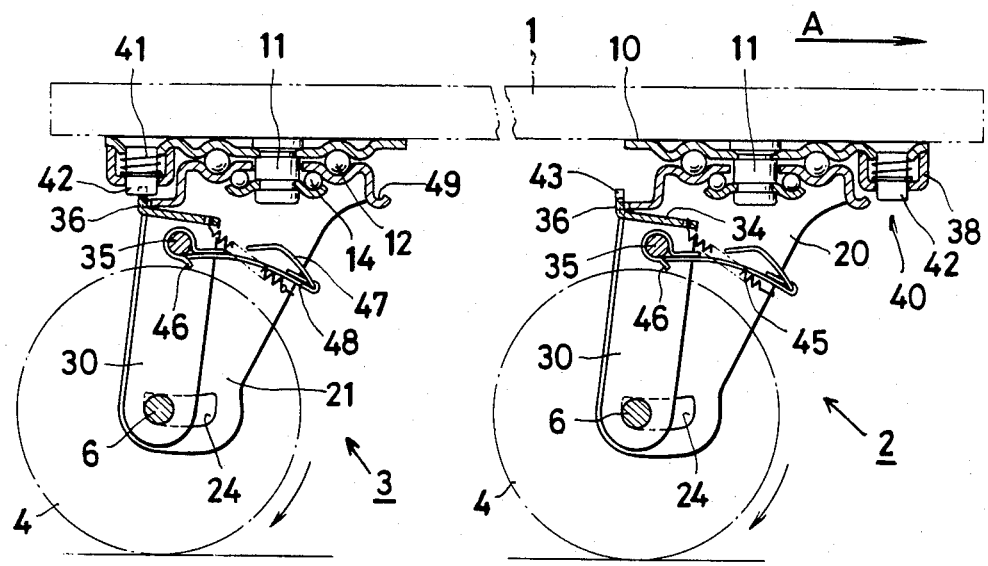
FIG. 4 is a side sectional view showing the traveling state in one direction of a traveling body on which the caster device is mounted.

With particular reference to FIGS. 1 and 2, a mounting base 10 mounted on the lower surface of a traveling body 1 has a vertical main shaft 11 substantially in a central portion thereof, and a connecting portion 22 of a swivel frame 20 having a leg 21 on either side thereof is horizontally and rotatably supported on the main shaft 11. Reference numeral 12 designates an external rolling ball retained between an annular groove 13 of the base 10 and an annular groove 23 of the swivel frame 20, whereas reference numeral 14 designates an internal rolling ball retained between a ball receiving plate 15 caulked to the lower end of the main shaft 11 and the connecting portion 22 of the swivel frame 20. Both the balls are provided to render as smooth swiveling of the swivel frame 20 relative to the base 10 as possible.

An axle 6 of a wheel 4 is supported by means of a pivotal frame 30 separately provided internally of the swivel frame 20, unlike the arrangement of the conventional caster devices. The pivotal frame 30 is in the form of a downwardly directed U-shape having a leg 33 on either side and a connecting portion 34 and is pivotally mounted on the swivel frame 20 through a pivotal shaft 35 positioned laterally away from the main shaft 11 with the upper portions of the legs 33 being horizontal, the pivotal frame 30 having the axle 6 of the wheel 4 supported downwardly thereof. Thus, the pivotal frame 30 and the wheel 4 may be pivotally moved about the pivotal shaft 35 within a range determined by a slot 24 which is provided in the leg 21 of the swivel frame 20 and into which the axle 6 is inserted. In this manner, in the present invention, the wheel frame is composed of the swivel frame and the pivotal frame which can rotate with respect to the swivel frame but can be pivotally moved laterally within a given range.

The base 10 and the pivotal frame 30 are provided with a direction restraining means 40 which is engaged and disengaged responsive to said pivotal movement of the pivotal frame 30. This direction restraining means 40 is provided with an engaging pin 42 biased downwardly by means of a compression spring 41 like a coiled spring accommodated within a hollow frame 38 provided on the lower surface of the base 10, and the pivotal frame 30 has an L-shaped bent portion 36 upwardly of the connecting portion thereof, which bent portion is formed with a cut groove 43 for receiving the engaging pin 42 therein, and the upper surface of the bent portion 36 of a portion on both sides of the cut groove 43 is formed into a guide surface 44. As best seen in FIG. 2, when the pivotal frame 30 is positioned at one end of pivotal movement, the cut groove 43 may come into engagement with the engaging pin 42 but when the pivotal frame 30 reaches the other end of pivotal movement, the cut groove 43 is released from engagement with said pin. When the pivotal frame 30 is positioned at such end of pivotal movement that the cut groove 43 is brought into engagement with the engaging pin 42, if the swivel frame 20 is swiveled, the engaging pin 42 is raised by the guide surface 44 of the pivotal frame 30 against the compression spring 41 and the pin 42 is finally moved into the cut groove 43.

The pivotal frame 30 is urged, by means of a tension spring 45 (FIG. 3) retained between the pivotal frame 30 and the swivel frame 20, towards the end of pivotal movement at which the cut groove 43 is engaged with the engaging pin 42, but a brake pawl 46 wound and disposed on the pivotal shaft 35 is provided to apply a force to the pivotal frame 30 towards the other end of pivotal movement against the force of the tension spring 45 or the force by which the axle 6 tends to be positioned rearwardly responsive to the traveling of the wheel 4. This brake pawl 46 is in contact with the outer circumference of the wheel 4 and will not impede rotation of the wheel 4 under the traveling condition wherein the axle 6 of the wheel 4 is positioned rearwardly of the main shaft 11 but when the traveling direction is changed over into a direction opposite the aforesaid traveling condition, the braking action is applied to the wheel. Reference numeral 47 designates a loop mounted on a tongue portion 48 of the brake pawl 46 with respect to the pivotal shaft 35, and when the loop 47 is extended over a hook 49 provided on the upper end of the swivel frame 20, the brake pawl 46 is disengaged from the wheel 4.

Caster devices constructed as described hereinbefore are respectively mounted at the four corners on the bottom surface of the traveling body 1 by the base 10 as shown in FIG. 4 but should be mounted so that the direction restraining means 40 of the respective caster devices are positioned at the upward end. When the traveling body 1 is urged to be moved in the direction as indicated by the arrow A under such a condition, the brake pawl 46 in every caster device is in a state wherein it bears on the wheel 4 but the brake pawl 46 is inclined in a rotational direction of the wheel 4, for which reason the pawl will not impede rotation of the wheel 4. At this time, the engaging pin 42 of the direction restraining means 40 of the first caster device 2 positioned frontwardly of the moving direction is not fitted into the cut groove 43, and therefore, the swivel frame 20 is in a state wherein it is rotatable with respect to the base 10, that is, the wheel is placed in a freely swiveling condition. The engaging pin 42 of the direction restraining means 40 of the second caster device 3 positioned rearwardly of the moving direction is fitted into the cut groove 43 and therefore the swivel frame 20 assumes a state wherein it is restrained with respect to the base 10, that is, the wheel is restrained from swiveling and the traveling body 1 can be easily changed over in direction to provide stabilized travel.

Figure 5:
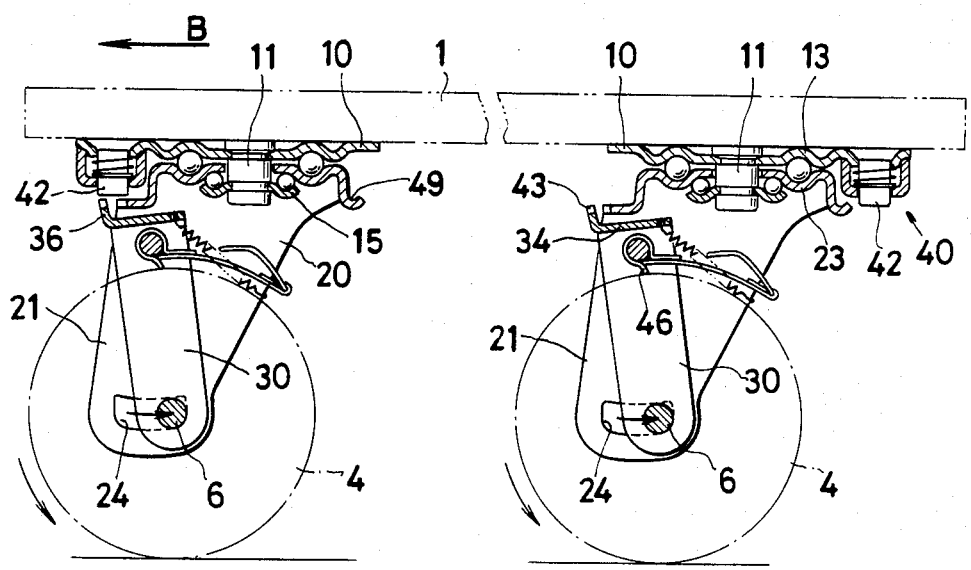
FIG. 5 is a side sectional view showing the state of the caster device when the traveling body is about to be moved in the opposite direction.
Figure 12:
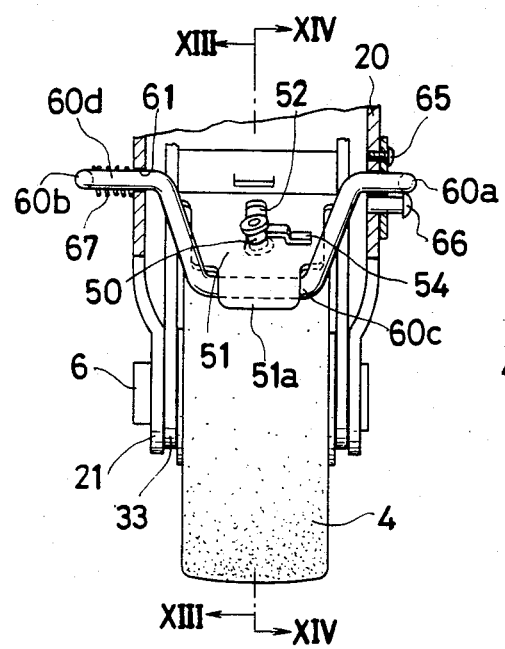
FIG. 12 is a front view showing a third embodiment of the caster device in accordance with the present invention.
Figure 13:
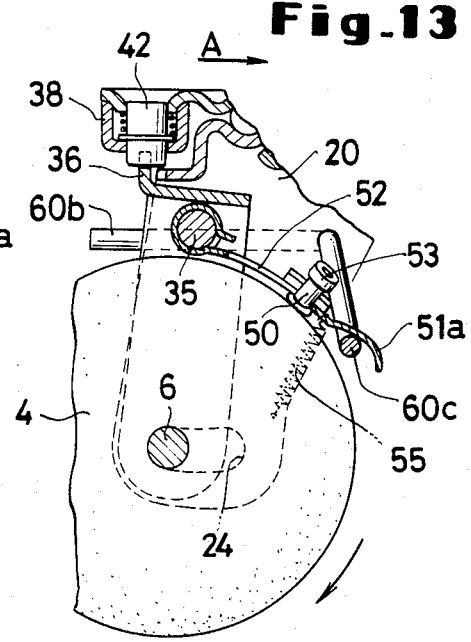
FIG. 13 is a sectional view taken along line XIII—XIII of FIG. 12.
Figure 14:
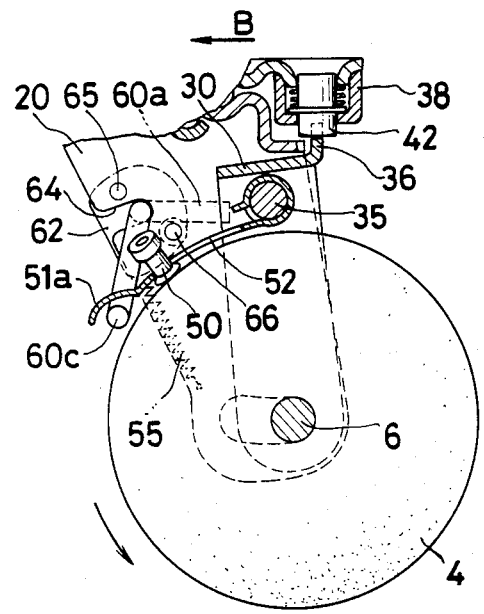
FIG. 14 is a sectional view taken along line XIV—XIV of FIG. 12.

When the traveling direction of the traveling body 1 is reversed from the aforesaid condition, the brake pawls 46 of the first and second caster devices respectively exert braking action on the wheels 4, as a consequence of which the axle 6 is moved rearwardly with respect to the traveling direction within the slot 24 of the swivel frame 20. Namely, the wheel 4 has been so far positioned rearwardly of the previous traveling direction by the force applied to the axle responsive to the traveling of the wheel and by the force of the tension spring 45 but the rotation of the wheel is stopped by the aforementioned braking action. However, since the traveling body 1 travels in the direction as indicated by the arrow B, the pivotal movement of the pivotal frame 30 about the pivotal shaft 35 causes movement of the axle 6 in the direction as indicated by the arrow in FIG. 5. As a result, the L-shaped bent portion 36 is moved downwardly and in the second caster device 3, the cut groove 43 positioned in the upper end of the L-shaped bent portion 36 is released from engagement with the engaging pin 42 with the result that the wheel so far restrained in traveling direction becomes free to swivel.

When the traveling body is further urged to move in the direction as indicated by the arrow B, the swiveling force about the main shaft 11 is applied to the swivel frame 20 since the axle 6 is positioned frontwardly of the main shaft 11. As a result, the swivel frame 20 swivels along with the pivotal frame 30 and the wheel 4 in such a manner that the axle 6 is positioned rearwardly of the main shaft 11, and with this swiveling, the axle 6 is again moved within the slot 24 as shown in FIG. 6 to raise the cut groove 43 of the pivotal frame 30 up to a position at which it comes into engagement with the engaging pin 42. Therefore, in the first caster device 2, the engaging pin 42 is fitted into the cut groove 43 to restrain the traveling direction whereas the other second caster device 3 becomes free to swivel. Accordingly, the condition assumed is that the leg 33 of the caster device 2 positioned frontwardly swivels freely whereas the leg 33 of the caster device 2 positioned rearwardly becomes restrained in swivel, whereby the traveling body 1 can be easily changed over in direction to provide stabilized traveling.

As described hereinbefore, the caster device in accordance with the present invention provides automatic switchover in which swiveling of the rear wheels is restrained whereas swiveling of the front wheels is made free in response to the operation in which the traveling direction is changed over to the direction A or to the direction B.

As is apparent from the foregoing, it will be noted that switchover is effected in the case the front and rear bases 10 are mounted on the lower surface of the traveling body in such a manner that the engaging pin 42 side is on the rear side or front side of the traveling direction. If the front and rear bases 10 should be mounted in one and the same direction, both the front and rear wheels are restrained in swivel in one traveling direction whereas both the wheels assume a freely swiveling state in the other traveling direction.

Next, FIG. 7(A) shows an example of the case in which both front and rear wheels are restrained in swivel, and the front and rear wheels are required to be restrained for example, in the case wherein as shown in FIG. 7(B), on an inclined floor, the traveling body 1 is urged to travel in a direction perpendicularly to the inclination of the floor surface or in the case wherein the traveling body 1 is stopped on the inclined floor surface. Now, when in the condition of FIG. 6, the loop 47 of the tongue portion 48 on the first caster device 2 is extended over the hook 49, the brake pawl 46 is disengaged from the wheel 4 as shown in FIG. 7(A). When the traveling direction is changed over to the direction A under said condition, the second caster device 3 is swiveled by the aforementioned operation to assume a state in which the leg 33 is restrained in swivel. At this time, the brake pawl 46 is disengaged from the wheel 4 on the side of the first caster device 2 and therefore no swiveling of the swivel frame 20 occurs. Thus, when the loop 47 on the side of the second caster device 3 is likewise extended over the hook 49, the brake pawl 46 is disengaged from the wheel 4 as shown in FIG. 7(A), and therefore, it assumes a state wherein neither the front nor the rear caster devices are subjected to the braking action caused by the brake pawl 46, that is, both the front and rear caster devices are restrained in swivel regardless of whether the traveling direction is changed over to direction A or B.

For the reason as described hereinbefore, since the traveling body 1 having four caster devices mounted on the lower surface thereof travels only in the linear direction, it can travel linearly in a direction crosswise of the inclined surface, and even if the traveling body is stopped halfway of the inclined surface, it will not move towards the inclined direction. It will suffice to provide the caster devices restrained in swivel, one for the front side of the traveling body and one for the rear side thereof, and therefore, the other caster devices need not be provided with the loop 47 and hook 49.

It should be appreciated that if the loop 47 is removed from the hook 49 to bring the brake pawl into contact with the wheel, the mode can be changed over so that the front side is swiveled freely whereas the rear side is restrained in swivel similarly to the previous embodiment.

FIGS. 8 through 11 show another embodiment of the brake member for applying the unidirectional braking action to the wheel 4, in which the same components as those of FIGS. 1 through 3 are denoted by like reference numerals. In this embodiment, a brake member comprises a brake screw 50 in the form of a countersunk screw, which brake screw 50 is supported in a slot 52 of a plate-like screw supporting tongue 51 having one end wound about the pivotal shaft 35. The screw supporting tongue 51 extends towards the side opposite the side of the cut groove 43 of the pivotal frame 30 with respect to the pivotal shaft 35, and the slot 52 is directed in the circumferential direction of the wheel 4.

The brake screw 50 is inserted from the bottom into the slot 52 so that a counter-sunk portion 50a thereof may bear on the outer peripheral portion of the wheel 4, and a stop ring 53 is snap-fitted about the insertion end. On one side at the lower end of the slot 52 is provided an inclination forcing plate 54 for inclining the brake screw 50 with respect to a center line L (see FIG. 9) of the wheel 4 through an angle of α, and the brake screw 50 is urged to be biased towards the wheel 4 side by means of a tension spring 55 stretched between the screw supporting tongue 51 and the swivel frame 20.

In the caster device constructed as described hereinbefore, in the traveling direction as indicated by the arrow A at which the main shaft 11 is positioned frontwardly of the wheel 4, as shown in FIG. 8, the brake screw 50 is positioned at the lower end of the slot 52 by the frictional force from the wheel 4, at which time said screw is inclined through the angle of α from the center line L of the wheel 4 by the inclination forcing plate 54 as mentioned hereinbefore, and therefore it is rotated in a direction as indicated by the arrow in FIG. 9 by the frictional force resulting from the rotation of the wheel 4. That is, the rotation of the wheel 4 is not impeded by the brake screw 50.

Conversely, when the traveling direction is reversed to the direction of arrow B as shown in FIG. 11, the brake screw 50 is moved up within the slot 52 by the frictional force from the wheel 4. When the brake screw reaches its upper limit, the screw is inclined, and the edge of the countersunk portion 50a is forced into the wheel 4 under the influence of the tension spring 55. For this reason, braking is applied to the wheel 4, as a consequence of which the pivotal frame 30 is pivotally moved to further swivel the swivel frame 20. Accordingly, the traveling direction may be changed over to restrain the swiveling of the wheel or render it free, in a manner similar to that of the previous embodiment.

Figure 15:
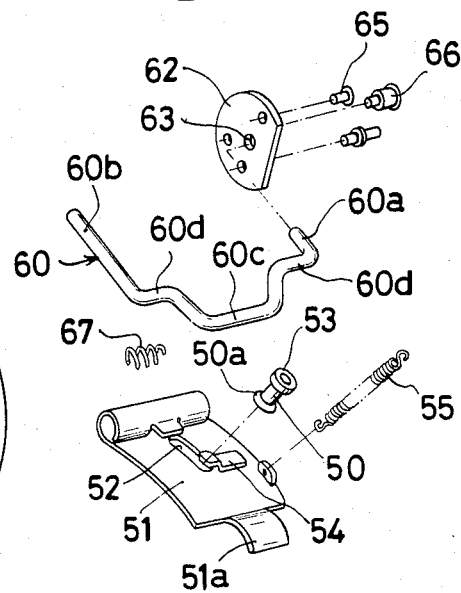
FIG. 15 is an exploded perspective view showing the brake means of the caster device shown in FIG. 12.

FIGS. 12 through 16 show an embodiment similar to the caster device shown in FIGS. 8 through 11 but wherein the brake screw 50 may be released from the wheel 4 by means of a brake releasing lever 60. As best seen in FIG. 15, the brake releasing lever 60 comprises a bent round rod having a locking portion 60a and an operating portion 60b positioned at opposite sides of the swivel frame 20, an engaging portion 60c positioned within the swivel frame 20 and opposed rotational shaft portions 60d fitted in the leg 21 of the swivel frame 20, the engaging portion 60c being positioned at the lower surface of the engaging tongue 51a provided at the lower end of the supporting tongue 51 of the brake screw 50. In mounting the brake releasing lever 60 on the swivel frame 20, the operating portion 60b is inserted into a hole 61 in one leg 21 to position one rotational shaft portion 60d within the hole 61 and the locking portion 60a is inserted into a hole 63 of an auxiliary plate 62 to position the other rotational shaft portion 60d within the hole 63, under which condition the rotational shaft portion 60d on the locking portion 60a side is inserted into a recess 64 of the other leg 21 of the swivel frame 20 and the auxiliary plate 62 is secured to the swivel frame 20 by means of a set screw 65 and a locking pin 66.

The brake releasing lever 60 is urged by a compression spring 67 inserted between the operating portion 60b and the leg 21 of the swivel frame 20, in the direction in which the locking portion 60a bears on the auxiliary plate 62, and on the other hand, when the locking portion 60a is positioned above or below the locking pin 66 against the aforesaid urging force, the locking pin 66 causes the brake screw 50 to be out of contact or in contact with the wheel 4.

That is, when the operating portion 60b of the brake releasing lever 60 is tilted downwardly as shown by the solid lines in FIG. 16, the locking portion 60a assumes a position below the locking pin 66 beyond the latter so that the supporting tongue 51 is raised through the engaging portion 60c and the engaging tongue 51a with the result that the brake screw 50 is released from the wheel 4. Thus, the braking action caused by the brake screw 50 is not effected and therefore the swiveling of the front and rear wheels may be restrained as shown in FIG. 7(A). On the other hand, when the operating portion 60b of the brake releasing lever 60 is positioned substantially horizontally as shown by the dotted lines in FIG. 16, the engagement between the engaging portion 60c and the engaging tongue 51a is released so that the brake screw 50 bears on the wheel 4, whereby the switchover between the restraining of swivel and free swivel of the wheels on the basis of the braking action can be carried out in a manner similar to that as previously described. In accordance with this embodiment, there is provided an advantage in that the brake member may be brought into engagement with or disengagement from the wheel in a simple manner by the operation of bringing the brake releasing lever 60 up or down.

FIGS. 17 through 21 show a further embodiment of brake means which applies braking action with respect to the unidirectional rotation of the wheel 4. In this embodiment, the brake means comprises an arrangement wherein breke blades 57 are extended on opposite ends of a cylindrical rotational member 56 loosely fitted in the pivotal shaft 35, said brake blade 57 having its forward end edge 58 placed adjacent the outer peripheral surface of a rim 5 protruded from each side of the wheel 4.

When the aforementioned caster device travels forward in a direction as indicated by the arrow A in FIG. 17, the wheel 4 is not subjected to the braking action under the condition wherein the forward end edge 58 of the brake blade 57 is in contact with the outer edge of the rim 5. Since the cut groove 43 of the bent portion 36 is fitted in the engaging pin 42, the wheel 4 is restrained in swivel and can only travel straight.

However, when the moving direction of the caster device is reversely changed over as indicated by the arrow B in FIG. 19, the forward end edge 58 of the brake blade 57 is forced into the outer edge of the rim 5 to thereby exert the braking force on the wheel 4, and said braking force and the movement of the caster device cause the pivotal movement of the pivotal frame 30 about the pivotal shaft 35 until the axle 6 reaches the other end of the slot 24. When the pivotal frame 30 is pivotally moved as mentioned above, the cut groove 43 is disengaged from the engaging pin 42, whereby the swivel frame 20 and pivotal frame 30 may be swiveled freely about the main shaft 11, and the movement of the caster device causes the swiveling of both frames 20, 30 and wheel 4 about the main shaft 11 through 180 degrees (see FIG. 20).

Under this condition, since nothing engages the cut groove 43, the wheel is in a freely swiveling state and may be moved in a straight and or curved manner. On the other hand, when the moving direction of the caster device is changed over while maintaining the aforesaid condition, the braking force is applied to the wheel 4 by the brake blade 57 and both frames 20, 30 and wheel 4 swivel while the pivotal frame 30 is pivotally moved. When both the frames and the wheel are swiveled through 180 degrees, the bent portion 36 causes the engaging pin 42 to be forced up from the bottom so that the cut groove 43 comes into engagement therewith to have the wheel restrained in swivel as shown in FIG. 17 to allow it to travel straight alone.

FIGS. 22 and 23 show a still another embodiment of the caster device in accordance with the present invention, in which the pivotal frame 30 is provided externally of the swivel frame 20. That is, the pivotal shaft 35 mounted upwardly between the legs 21 of the swivel frame 20 has its ends projected from the outer surface of the legs 21, and an upper portion of leg 33 of the pivotal frame 30 is jounalled on said projected portion. The connection portion 34 is positioned between the external upper ends of the legs 33, and the bent portion 36 formed with the cut groove 43 is aligned with the upper edge of the connection portion 34.

Also, in the embodiment of the caster device shown in FIGS. 22 and 23, when the moving direction is reversed, the forward end edge 58 of the brake blade 57 presses the rim 5 of the wheel 4 to thereby exert braking force on the wheel 4, and the braking force and the moving action of the caster device cause the pivotal movement of the pivotal frame 30 about the pivotal shaft 35. Thus, whenever the moving direction is changed, the caster device is changed in mode from the swivel restraining condition to the free swivel condition or from the free swivel condition to the swivel restraining condition.

Further, in either embodiment shown in FIGS. 17 and 22, a brake mechanism has a tongue 48 extended from the rotational member 56, the tongue 48 having a loop 47 provided at the free end thereof, and when the loop 47 is engaged with the hook 49 provided upwardly of the swivel frame 20, the brake blade 57 is disengaged from the side rim 5.

Thus, even if the moving direction of the caster device is changed over, the braking force is not exerted on the wheel since the brake blade 57 is not in contact with the rim 5. This is particularly effective in the case wherein if the wheel is restrained in swivel, even if the moving direction of the caster device is changed over, the device is advanced straight alone while maintaining such a restraining condition.

It should be appreciated that the forward end edge 58 of the brake blade 57 may be formed with teeth so that the forward end edge may be readily forced into the outer peripheral portion of the rim 5, and the brake mechanism can be mounted on a portion other than the support shaft.

Figure 24:
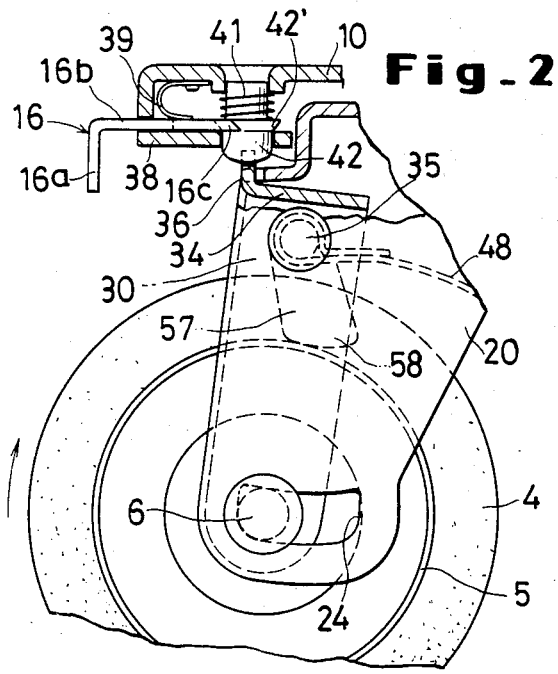
FIG. 24 is a side view showing a sixth embodiment of the caster device in accordance with the present invention.
Figure 25:
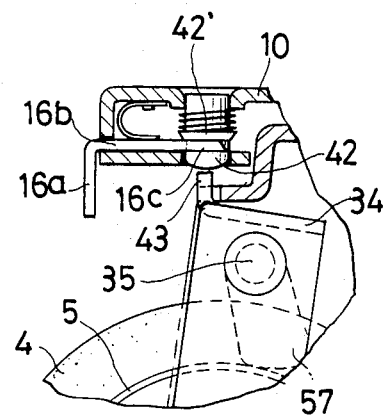
FIG. 25 is a partially cutaway side view illustrating the operation of a mechanism in which the wheel in the caster device shown in FIG. 24 is in a freely traveling state.
Figure 26:
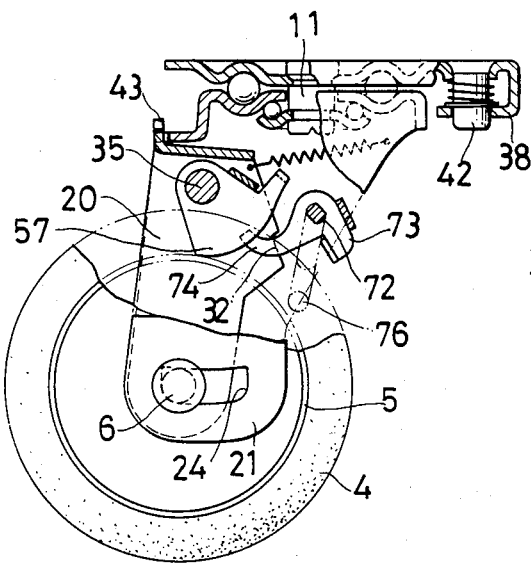
FIG. 26 is a side view showing a seventh embodiment of the caster device in accordance with the present invention.
Figure 27:
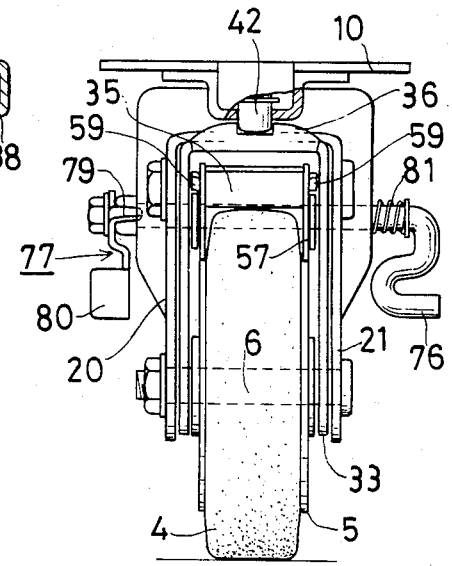
FIG. 27 is a front view of the caster device shown in FIG. 26.
Figure 28:
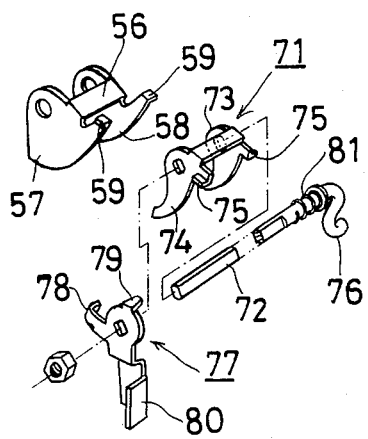
FIG. 28 is an exploded perspective view of a mechanism for stopping the pivotal movement of the pivotal frame of the caster device shown in FIG. 26.
Figure 29:
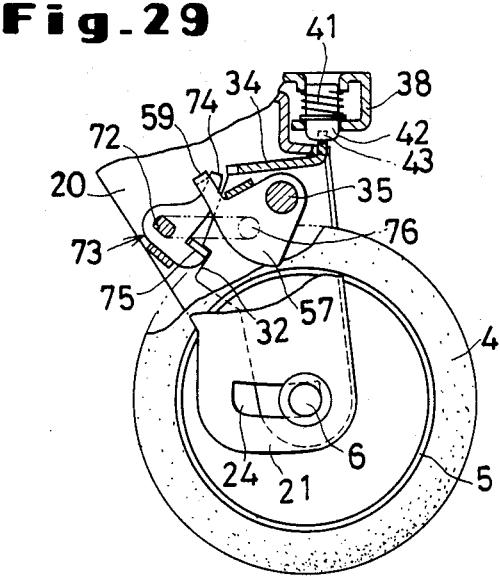
FIGS. 29 and 30 are explanatory views showing the state for stopping the pivotal frame of the caster device shown in FIG. 26.

Next, a description will be made in connection with FIGS. 24 and 25 of a mechanism in which the wheel 4 of the caster device is placed in a freely movable state, that is, the wheel can be directed in any direction. The caster devices having the construction so far described may be employed. The caster device is accommodated within a hollow frame 38 provided on the lower surface of the base 10, a flange-like receptacle 42' is provided halfway in height of the engaging pin 42 normally downwardly projected by the urging element 41, and an operating member 16 is provided adjacent the receptacle 42'. The operating member 16 comprises an operating element 16a provided at the outer forward end of a plate member 16b extended frm the interior of the hollow frame 38 towards the exterior thereof, and a forked operating element 16c holding the engaging pin 42 therebetween at the other end, the plate member 16b being biased towards the bottom of the hollow frame 38 by means of a laterally directed U-shaped plate spring 39 provided internally of the hollow frame 38. The forward end of the forked operating element 16c is pointed, which is placed adjacent the lower surface of the receptacle 42' of the engaging pin 42. Thus, if the operating element 16a of the operating member 16 is extended from the hollow frame 38, the forward end of the operating element 16c is not borne on the receptacle 42', and therefore the engaging pin 42 is projected from the lower surface of the hollow frame 38 by the urging element 41, whereby the pin is engaged with or disengaged from the cut groove 43 in the bent portion 36 provided on the connection portion 34 of the pivotal frame 30. When the cut groove 43 engages the engaging pin 42, the swivel frame 20 and the pivotal frame 30 cannot be horizontally rotated about the main shaft 11 and therefore the wheel 4 travels straight. However, when the operating element 16a is forced towards the hollow frame 38 to move the plate member 16b, the forked operating element 16c is driven into the lower surface of the receptacle 42', and therefore the engaging pin 42 is moved up through the thickness of the operating element 16c and hidden into the hollow frame 38 (FIG. 25). As a result, the engagement of the cut groove 43 of the bent portion 36 with the engaging pin is released so that the swivel frame 20 and pivotal frame 30 may be freely rotated horizontally about the main shaft 11, thus placing the wheel 4 in a free traveling state in which the wheel may be directed in any direction. Accordingly, in the caster device with the operating element 16 forced in, when the traveling direction thereof is changed, the braking is exerted on the wheel so that the pivotal frame 30 supporting the wheel 4 thereon is always rotated about the main shaft 11.

Next, a description will be made of a further embodiment of a mechanism, in connection with FIGS. 26 to 30, in which the pivotal movement of the pivotal frame 30 is stopped to maintain the engagement between the engaging pin 42 and the cut groove 43 to thereby restrain the swiveling of the wheels.

A wheel swivel restraining mechanism 71 in accordance with this embodiment has an arrangement wherein a flat shaft 72 extended through a position not impairing the pivotal movement of the pivotal frame 30 upwardly of the swivel frame 20 is integrally provided with a control member 73, the shaft 72 being rotated so that the pivotal frame 30 may be stopped or released by the control member 73. The control member 73 has a pair of pressing elements 74 which extend obliquely and downwardly, each of the pressing members 74 having an outwardly bent control element 75 provided on the upper end thereof. On one end of said shaft 72 is provided a bent first operating portion 76 positioned externally of the side of the swivel frame 20, and on the other end of the shaft 72 is provided a stopper portion 77 positioned externally of the other side. The stopper portion 77 comprises a stopper element 78 which bears on the side edge of said side, a pawl element 79 which presses against said side and a second operating portion 80 which extends downwardly, the stopper portion being rotated integral with the shaft 72.

When the aforesaid control mechanism 71 is mounted on the swivel frame 20, each of pressing elements 74 of the control member 73 is positioned between the brake blade 57 of the control mechanism and the side 33 of the pivotal frame 30 and placed adjacent the receptacle 59.

When the shaft 72 is rotated, each of control elements 75 of the control member 73 is placed adjacent a stepped engaging portion 32 formed halfway of the side edge of each side 33 of the pivotal frame 30. The shaft 72 urges the pawl element 79 of the stopper portion 77 so that the pawl element 79 may come into pressure contact with the external surface of the side 21 by means of a coiled spring 81 wound about the shaft 72.

Figure 30:
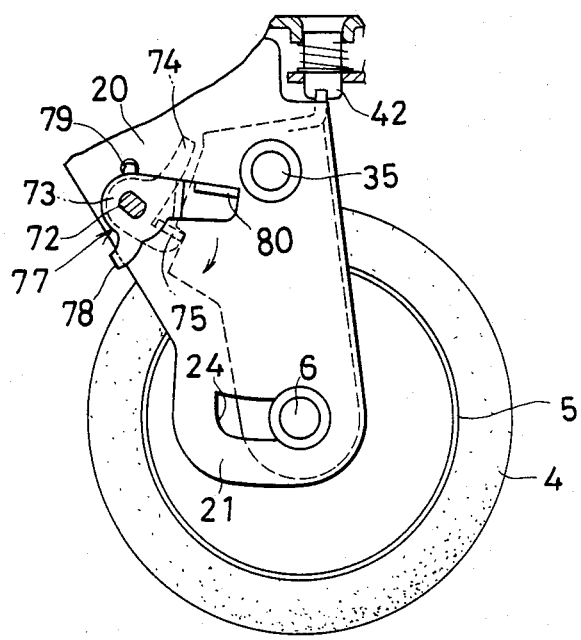

In the structure as described hereinbefore, when the shaft 72 is rotated by the first operating portion 76 or the second operating portion 80 to turn the control member 73 upwardly, each pressing element 74 causes the receptacle 59 of the brake blade 57 to be forced up, as a consequence of which the end edge 58 of the brake blade 57 is released from the side 5 of the wheel 4. At the same time, each control element 75 comes into engagement with the stepped engaging portion 32 formed in each side 33 of the pivotal frame 30 whereby the pivotal frame 30 is not pivotally moved. In this manner, when each caster device of carriers is driven by the control member 73, braking is not applied to the wheel and the pivotal frame 30 becomes fixed to the swivel frame 20. Accordingly, when the control member 73 is actuated under the condition that the cut groove 43 of the pivotal frame 30 is fitted in the engaging pin 42, the wheels in all caster devices become fixed, and even if the carrier is moved crosswise to an inclined surface, no rolling occurs, and the carrier can remain stationary in a direction perpendicular to the inclined surface. It will be noted that the stopper element 78 of the stopper portion 77 provided on the control mechanism 71 impinges upon the side edge of the side 21 of the swivel frame 20 to control the range of rotation of the control member 73 and is resiliently fitted by means of a coiled spring 81 into either of two depressions (not shown) formed in the outer surface of the side 21 to locate the control member into one case in which the control member acts and the other case in which the control member does not act (FIG. 30). Also, the operating member 16 shown in FIGS. 24 and 25 and the aforementioned wheel restraining mechanism 71 may be used so that the front wheels in the traveling direction of the carrier may be placed in a locked condition whereas the rear wheels thereof are placed in a freely traveling condition. That is, the mechanism 71 of the front caster device is actuated to stop the pivotal movement of the pivotal frame and the operating member 16 of the rear caster device is forced in to introduce the engaging pin 42 into the hollow frame 38. In this manner, the front wheels become locked whereas the rear wheels become freed. Thus, a heavily loaded carrier can be easily pushed upwardly along an inclined surface.

Briefly, it will be apparent from the foregoing that in accordance with the present invention, a caster device comprises a swivel frame and a pivotal frame pivotally moved by a brake mechanism, the pivotal frame being engaged or released by a stopper mechanism to thereby place the caster frame in a locked or freely traveling condition, and a control mechanism is provided to lock or pivotally move the pivotal frame. If these various mechanisms are suitably operated to mount the caster devices on the carrier, the front caster devices may be always brought into a freely traveling condition whereas the rear caster devices all in a locked condition or vice versa, and in addition, the all caster devices can be brought into a freely traveling condition or a locked condition. As described above, since the present device may be used in a variety of modes, it is materially effective for use with carriers. Moreover, the above-described various mechanisms merely need be rotated or slidably moved and so they can be operated in a simple manner, and therefore, they may be applied not only to handcarts but to apparatuses which use caster devices for wagon vehicles, moving beds, and the like, in dining rooms, restaurants, hospitals, etc.

Obviously, many modifications and variations of the present invention are possible in light of the above teachings. It is therefore to be understood that within the scope of the appended claims, the present invention may be practiced otherwise than as specifically described herein.

What is claimed is:

1. A caster device for a travelling body, comprising:
   a base mounted upon the lower surface of said travelling body;
   a first frame mounted upon said base so as to be rotatable about a first axis;
   a second frame pivotably mounted upon said first frame about a second axis;
   a wheel rotatably supported upon said second frame;
   first locking means mounted upon said base;
   second locking means mounted upon said second frame for cooperating with said first locking means so as to permit or prevent rotational movement of said first frame about said first axis; and
   braking means mounted upon said second frame for engaging said wheel, yet permitting rotation thereof, and for permitting said first and second locking means to be engaged so as to prevent said rotational movement of said first frame about said first axis in response to a first directional movement of said travelling body along a surface upon which said wheel is rotating, said braking means also engaging said wheel for stopping rotation thereof and for causing pivotal movement of said second frame and disengagement of said first and second locking means so as to permit said rotational movement of said first frame about said first axis in response to a second directional movement of said travelling body along said surface upon which said wheel is rotating in which said second directional movement is the reverse of said first directional movement.

2. The caster device according to claim 1 wherein said brake means comprises a brake pawl wound about a pivotal shaft, defining said second axis and bearing on the wheel.

3. The caster device according to claim 2 wherein the brake pawl may be moved towards and away from the wheel by means of an engaging ring mounted on the end of said wound brake pawl extending from said pivotal shaft and is engageable with the first frame.

4. The caster device according to claim 1 wherein the brake means comprises a screw supporting tongue having one end mounted on a pivotal shaft defining said second axis, a slot bored in said screw supporting tongue and elongated in the circumferential direction of the wheel, a brake screw inserted into said slot to bear on the wheel, and an inclination forcing plate adapted to incline said brake screw relative to the center line of the wheel when said brake screw is positioned dowwardly of the slot and adapted to rotate said brake screw by the frictional force resulting from rotation of the wheel.

5. The caster device according to claim 4 wherein a brake releasing lever is supported on an outer frame to move the screw supporting tongue up and down with respect to the wheel to move the brake screw towards and away from the wheel.

6. The caster device according to claim 1 wherein the brake means comprises a cylindrical rotary member rotatably mounted on a pivotal shaft defining said second axis and brake blades extended from opposite ends of said rotary member, said brake blades having a forward end edge placed adjacent the outer peripheral surface of a side rim of the wheel.

7. The caster device according to claim 6 wherein said cylindrical rotary member is further provided with an engaging ring engaged with the first frame.

8. A caster device as set forth in claim 1, wherein: said first axis is disposed perpendicular to said base.

9. A caster device as set forth in claim 1, wherein: said first axis is disposed vertically.

10. A caster device as set forth in claim 9, wherein: said second axis is disposed horizontally.

11. A caster device as set forth in claim 10, further comprising:
an axle for supporting said wheel upon said second frame, wherein said axle is disposed parallel to said second axis.

12. A caster device as set forth in claim 11, further comprising:
slot means defined within said second frame for accommodating said wheel axle so as to permit said pivotable movement of said second frame relative to said first frame.

13. A caster device as set forth in claim 11, wherein: said braking means engages said wheel for stopping rotation thereof when said axle is disposed longitudinally forwardly of said second axis as viewed in a direction of travel of said travelling body.

14. A caster device as set forth in claim 1, wherein: said first locking means comprises a spring-biased pin; and
said second locking means a slotted plate.

15. A caster device as set forth in claim 14, further comprising:
cam follower means defined upon said spring-biased pin; and
an operating cam for engaging said cam follower upon said pin for disengaging said pin from said slotted plate.

16. A caster device as set forth in claim 1, wherein: said first locking means is mounted upon said base at a longitudinal position rearwardly of said first axis as viewed in said first directional movement of said travelling body.

17. A caster device as set forth in claim 1, wherein: said travelling body is provided with at least two of said caster devices separated longitudinally along said travelling body as viewed in either one of said first or second directional movements of said travelling body; and
when a first one of said at least two of said caster devices comprises the longitudinally forward one of said at least two of said caster devices as viewed in either one of said first or second directional movements of said travelling body, said first locking means of said first one of said at least two of said caster devices is disposed longitudinally forwardly of said first axis, while when a second one of said at least two of said caster devices comprises the longitudinally rearward one of said at least two of said caster devices as viewed in either one of said first or second directional movements of said travelling body, said first locking means of said second one of said at least two of said caster devices is disposed longitudinally rearwardly of said first axis.

18. A caster device as set forth in claim 1, wherein: said first and second directional movements are perpendicular to said first axis.

* * * * *